US009937582B2

(12) United States Patent
Sunaga et al.

(10) Patent No.: US 9,937,582 B2
(45) Date of Patent: Apr. 10, 2018

(54) RESISTANCE WELDING DEVICE AND RESISTANCE WELDING METHOD

(71) Applicant: NSK LTD., Tokyo (JP)

(72) Inventors: Takashi Sunaga, Tokyo (JP); Noboru Kaneko, Tokyo (JP); Osamu Miyoshi, Tokyo (JP); Ryoichi Suzuki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/126,642

(22) PCT Filed: Apr. 15, 2015

(86) PCT No.: PCT/JP2015/061535
§ 371 (c)(1),
(2) Date: Sep. 16, 2016

(87) PCT Pub. No.: WO2015/159907
PCT Pub. Date: Oct. 22, 2015

(65) Prior Publication Data
US 2017/0080513 A1   Mar. 23, 2017

(30) Foreign Application Priority Data

Apr. 17, 2014  (JP) .................................. 2014-085297
Jan. 20, 2015  (JP) .................................. 2015-008794
Feb. 23, 2015  (JP) .................................. 2015-032862

(51) Int. Cl.
*B23K 11/14*     (2006.01)
*B23K 11/25*     (2006.01)
(Continued)

(52) U.S. Cl.
CPC ............. *B23K 11/14* (2013.01); *B23K 11/00* (2013.01); *B23K 11/24* (2013.01); *B23K 11/25* (2013.01);
(Continued)

(58) Field of Classification Search
CPC ...... B62D 5/0403; B23K 11/14; B23K 11/24; B23K 11/25; B23K 11/00; B23K 2201/006
See application file for complete search history.

(56) References Cited

U.S. PATENT DOCUMENTS 3,774,009 A * 11/1973 Hodges ............... B23K 11/0066
219/93
4,873,411 A * 10/1989 Saen ................... H01R 43/0214
219/91.21
(Continued)

FOREIGN PATENT DOCUMENTS

JP        04-052081 A      2/1992
JP        5-283139 A      10/1993
(Continued)

OTHER PUBLICATIONS

Machine translation of Japan Patent document No. 2004-34,105, Aug. 2017.*
(Continued)

*Primary Examiner* — Geoffrey S Evans
(74) *Attorney, Agent, or Firm* — Sughrue Mion, PLLC

(57) ABSTRACT

A resistance welding device is provided with a moving distance measuring section for measuring distances between conductors to be joined before and after joining and evaluating joining quality based on the distances, and a projection including a base and a projecting surface is provided to the conductor to be connected in order to easily secure a distance between the conductors after the joining.

16 Claims, 13 Drawing Sheets

(51) Int. Cl.
*B23K 11/00* (2006.01)
*B23K 11/24* (2006.01)
*B62D 5/04* (2006.01)
*B23K 101/00* (2006.01)

(52) U.S. Cl.
CPC ...... *B62D 5/0403* (2013.01); *B23K 2201/006* (2013.01)

(56) References Cited

U.S. PATENT DOCUMENTS

| | | | |
|---|---|---|---|
| 8,552,332 B2 * | 10/2013 | Aoyama | B23K 11/0053 219/86.1 |
| 9,718,143 B2 * | 8/2017 | Pieterman | B23K 11/14 |
| 2007/0246289 A1 * | 10/2007 | Tominaga | B62D 5/0406 180/444 |
| 2009/0316418 A1 * | 12/2009 | Mittler | B23K 33/00 362/362 |

FOREIGN PATENT DOCUMENTS

| | | | |
|---|---|---|---|
| JP | 6-036852 A | | 2/1994 |
| JP | 7-214338 A | | 8/1995 |
| JP | 10-156549 A | | 6/1998 |
| JP | 2004-34105 A | * | 2/2004 |
| JP | 2007-326125 A | | 12/2007 |
| JP | 2008-110357 A | | 5/2008 |
| JP | 2010-510641 A | | 4/2010 |

OTHER PUBLICATIONS

International Search Report for PCT/JP2015/061535 dated Jul. 21, 2015.

* cited by examiner

FIG.3A
FIG.3B
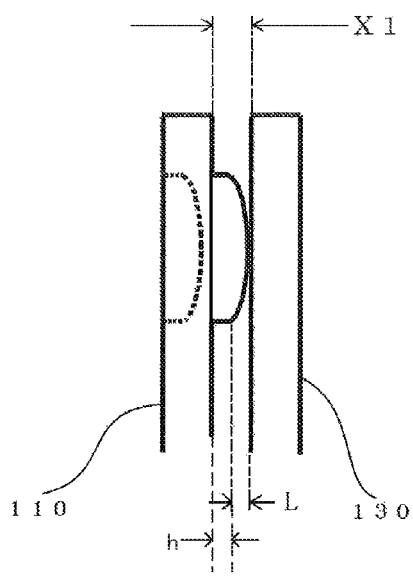
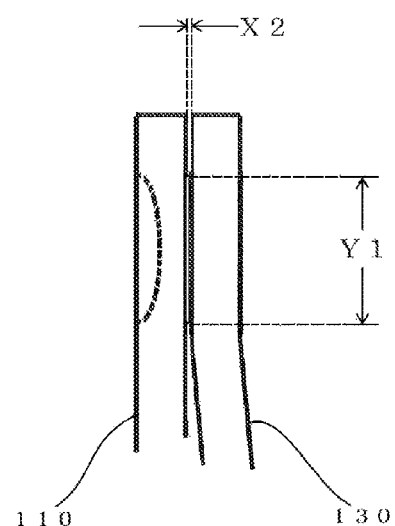

FIG.10A2
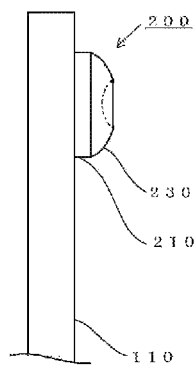
FIG.10C2
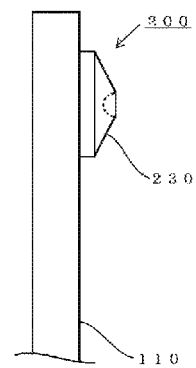
FIG.10D2
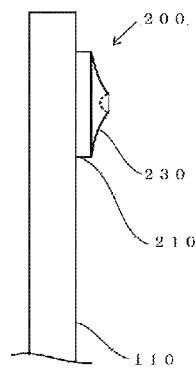
FIG.10E2
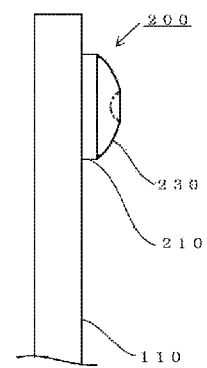
FIG.10A3
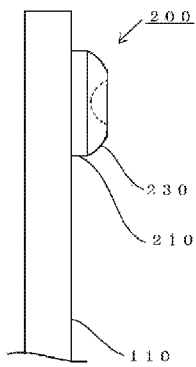
FIG.10C3
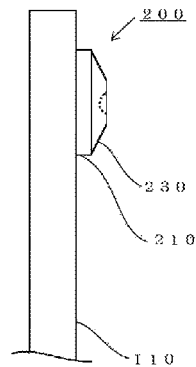
FIG.10D3
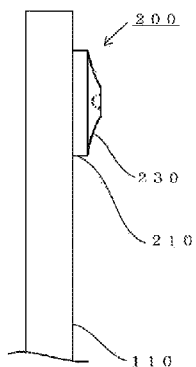
FIG.10E3
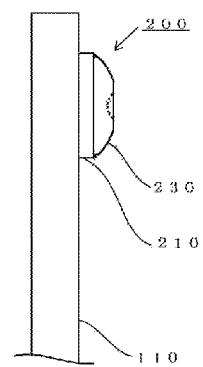

RESISTANCE WELDING DEVICE AND RESISTANCE WELDING METHOD

CROSS REFERENCE TO RELATED APPLICATIONS

This application is a National Stage of International Application No. PCT/JP2015/061535 filed Apr. 15, 2015, claiming priority based on Japanese Patent Application Nos. 2014-085297 filed Apr. 17, 2014, 2015-008794 filed Jan. 20, 2015 and 2015-032862 filed Feb. 23, 2015, the contents of all of which are incorporated herein by reference in their entirety.

TECHNICAL FIELD

The present invention relates to a resistance welding device, and more specifically, relates to a resistance welding device and a resistance welding method for measuring distances between objects to be joined before and after joining for determining quality of the joining, a shape of a projection appropriate for determination of the joining quality, provided on the objects to be joined for projection welding, and a technique using these for connecting conductors of an electric power steering apparatus.

BACKGROUND ART

Used in the related art is resistance welding devices that weld conductors such as a metal plate by using, for example, a projection welding or a spot welding.

These welding devices carry out the joining by applying a current between objects to be joined for welding, concentrating the current at a joining area of the objects to be joined, and increasing a temperature of the joining area above a joinable temperature with Joule heat generated by the concentration of the current in that manner.

In such a welding device, the objects to be joined are good conductors such as metals from necessity to apply a current for the joining, and a shape such as a projection is provided at the joining area of the objects to be joined in order to concentrate the current.

For example, in Patent Document 1 (Japanese Published Unexamined Patent Application No. H5-283139 A), a resistance welding method of dissimilar metal terminals is disclosed.

A method in Patent Document 1 is described as a resistance welding method of dissimilar metal terminals for reliably welding normal flat plate-type dissimilar metal terminals, and carries out the joining by forming a projection for projection welding on a low-melting-point metal terminal small in heat capacity and radiating heat of the projection during the welding toward a high-melting-point metal plate large in heat capacity. More specifically, when a large current is applied instantaneously by using a capacitor-type direct current resistance welder, heat is lost (radiated) toward the high-melting-point metal plate large in heat capacity, which prevents an excess heat generation of the projection on the low-melting-point metal terminal small in heat capacity for the welding.

Another example of welding using a projection for projection welding is disclosed in Patent Document 2 (Japanese Published Unexamined Patent Application No. 2010-510641 W).

This aims for an effect to solve problems caused in a welding process, to improve productivity, and to reduce possibilities of defects by replacing low price competitive nickel, in a method for connecting to batteries by changing a plurality of battery connecting members from an expensive nickel plate member to a copper alloy plate member and further applying a corrosion prevention coating layer in order to prevent copper from oxidizing in air. More specifically, the copper does not generate a sufficient heat during the resistance welding due to high conductivity. Therefore, it is of great difficulty to carry out a welding process for connecting the copper to an electrode terminal, but formation of an embossed structure at one end of a connecting member causes a supplied current to concentrate at a projecting portion with the embossed structure. As a result, a resistance value increases on the projecting portion, from which heat is intensively generated. This leads a temperature of the projecting portion to a melting temperature. Thus, at this time, the welding is carried out by applying a physical pressure to the connecting member. The temperature of the projecting portion reaches the melting temperature faster than a temperature of a dent facing the projecting portion, which prevents the connecting member from adhering to a welding rod.

A technique relating to a printed wiring board is disclosed in Patent Document 3 (Japanese Published Unexamined Patent Application No. H6-36852 A). The technique disclosed in Patent Document 3 is described as a method for connecting a terminal to a printed wiring board, wherein a projecting part is joined to a conductor circuit with metal diffusion by providing a projecting part on a connecting surface of a tip part of the terminal and applying an ultrasonic vibration while fitting closely and pressurizing the projecting part of the terminal on a surface of the conductor circuit on a printed wiring board. In terms of the effects, it is described that the welding pressure and the ultrasonic vibration can be intensively and efficiently applied to the projecting part in joining to the conductor circuit with the metal diffusion.

THE LIST OF PRIOR ART DOCUMENT

Patent Documents

Patent Document 1: Japanese Published Unexamined Patent Application No. H5-283139 A
Patent Document 2: Japanese Published Unexamined Patent Application No. 2010-510641 W
Patent Document 3: Japanese Published Unexamined Patent Application No. H6-36852 A

SUMMARY OF THE INVENTION

Problems to be Solved by the Invention

However, with the configuration disclosed in Patent Document 1, there are constraints between the metal terminals identical in the heat capacity and further between the metal plates identical in a melting point, and the excess heat generation due to a large current at the projection for the projection welding is not necessarily prevented.

With the configuration disclosed in Patent Document 2, a shape of the embossed projecting portion is in a hemisphere shape, and a squeeze (teen tubes: pressing stroke) is not particularly considered. Therefore, there is a problem of difficulty in confirming the welding. Furthermore, with a simple hemisphere shape as described above, a current-applying sectional area is instable, and the welding current is likely to leak.

In addition, the connection by the method disclosed in Patent Document 3 is used for an internal connection of a semiconductor, and it is substantially impossible to apply a high current responding to an output of a power device. Furthermore, only formation of, for example, a cylindrical shape as the projecting part on a surface of a joining electrode as described in Patent Document 3 causes instability in contact between electrodes due to the largeness of current-applying sectional area from the start. In a case where fewer nuggets are generated at the welding portion attributable to the instability, poor welding is caused, and when a gap after the welding is larger than expected, the welding is insufficient and a terminal may be damaged.

Therefore, the techniques as described above cannot sufficiently respond to equipments used in, for example, an electric power steering apparatus (EPS) used for a vehicle, requiring an electrical connecting reliability and a mechanical joining strength for resistance welding portions.

That is, the electric power steering apparatus applies a steering assist force (assist force) to a steering mechanism of the vehicle with a rotational force of a motor, and applies a steering assist force to a steering shaft or a rack shaft by a transmission mechanism such as gears or a belt through a reducing mechanism with a driving force of the motor. Such the electric power steering apparatus accurately generates a torque of the steering assist force, and thus carries out a feedback control of the motor current.

A control unit (ECU) that controls the electric power steering apparatus by, for example, the above feedback control comprise, for example, a micro-control unit (MCU) as a core part, and, for example, has a basic configuration and a function as illustrated in FIG. 12 and the below.

Namely, in the micro-control unit, as illustrated in FIG. 12, a steering torque Th detected by a torque sensor 15, a vehicle speed Vel detected by a vehicle speed sensor 17 and a steering angle θ detected by a steering angle sensor 19 which constitute the electric power steering apparatus, are inputted into a control computing section 20 serving as a control computing apparatus. A power-supply voltage Vdd and a reset signal RS for apparatus-halt from a power circuit unit 10 are inputted, and an ignition voltage from an IGN voltage monitoring section 13 is inputted, and then for example, a feedback signal Im from a current detecting circuit 43 is inputted into the control computing section 20. A current command value computed in the control computing section 20 is inputted into a gate driving section 30, and a gate driving signal formed in the gate driving section 30 based on, for example, the current command value is inputted into a motor driving section 40 comprising a bridge configuration of FETs.

Such an inverter constituting the motor driving section 40 comprises a plurality of FETs provided with free wheel diodes, and further comprises a three-phase bridge having upper-and-lower arms made up of an upper-stage FET 2 and a lower-stage FET 5 in a U-phase, upper-and-lower arms made up of an upper-stage FET 3 and a lower-stage FET 6 in a V-phase and upper-and-lower arms made up of an upper-stage FET 1 and a lower-stage FET 4 in a W-phase. Gates of the FETs each are driven by an output of the gate driving section 30.

Then, a current from the motor driving section 40 connects, through a cutoff circuit 50 for an emergency stop, an output terminal of the FETs from the motor driving section 40 and a motor terminal block on a side of a motor 60 in a part of a current supply line C within a range of an ellipse illustrated with an arrow and a chained line in FIG. 12. A terminal for the connection is, for example, as illustrated in a front view of FIG. 13A, a bottom view of FIG. 13B, a back view of FIG. 13C and a side view of FIG. 13D, arranged such that electrodes (UT, VT, WT) for the U-, V- and W-phases each having a welding part w are arranged nearly in alignment for substantially uniform current pathways of wirings in each of the phases, and then connected to the motor 60 including a three-phase brushless motor from the motor terminal block for driving the motor 60.

Therefore, the current supply line C illustrated with the ellipse is an electrically important part where the wirings of the U-, V- and W-phases to the motor 60 are screwed, a high current close to 100 [A] at the maximum is applied, and heat is generated as well. In addition, at a time when the motor wirings are connected during assembly, a large tightening torque is inputted from a tool, and thus, a static mechanical configuration is also necessary. Furthermore, minute vibrations from roads, engine vibrations and mechanical vibrations such as steering are constantly propagated during running of the vehicle. Therefore, the electric power steering apparatus for the vehicle installed in a steering column of the vehicle is in a harsh environment.

Accordingly, in a case where the output terminal of the FETs is connected to the motor terminal block by means of the resistance welding, a high electrical connecting reliability and a mechanical joining strength are required at the resistance welding portions. However, these high reliability and sufficient mechanical joining strength may not be obtained by the techniques described in the related art documents.

Thus, an object of the present invention is to provide a resistance welding device and a resistance welding method that solve each problem of the related arts, measure distances between conductors to be joined and determine quality of joining based on the distances before and after the joining in the resistance welding between conductors corresponding to an output of a power device, as well as to provide a projection shape allowing appropriate joining and suitable for determination of the joining quality in the resistance welding.

Means for Solving the Problems

For resolving the above-described problems, the present invention provides a resistance welding device that performs joining of two conductors by resistance welding, comprising: at least a measuring section that measures a distance between the two conductors and determines quality of the joining, wherein the measuring section measures a first distance before the joining and a second distance after the joining, and determines the quality of the joining based on a difference between the first and second distances.

The above-described object of the present invention is more effectively achieved by that wherein the two conductors are two metal plates for electrical connection, a projection is provided on one end on a plate surface of either one of the two metal plates, facing the other metal plate, and the projection comprises a base and a projecting surface formed on a top part of the base; or wherein a plate surface of one of the two metal plates is a flat surface, and the projection is provided on a plate surface of the other facing metal plate; or wherein the base of the projection is in a cylindrical shape, and the projecting surface is in a hemisphere shape formed on a top surface of the base; or wherein a projecting surface portion in a hemisphere shape formed on the top surface of the base is entirely melted in welding; or wherein a recessed surface corresponding to the projection is formed on a back surface of the plate surface at a part, on which the projection is provided, of one metal plate provided with the projection; or wherein the determination of the joining quality at the measuring section is made based on a comparison between the difference in distance between the two metal plates before and after the joining and a height of the projecting surface provided on the top part of the base; or wherein the determination of the joining quality at the measuring section is made based on a comparison between an area of the joining portion after the joining and a size of a sectional area of the two metal plates; or an electric power steering apparatus having a joining part of conductors formed by the above resistance welding device.

Further, for resolving the above-described problems, the present invention provides a resistance welding method for joining two conductors by resistance welding, comprising at least the steps of: making joining portions of the two conductors abut on each other; measuring a distance between the two conductors; joining the two conductors by pressing the joining portions of the two conductors in a joining direction by two welding electrodes that sandwich the two conductors from aback surface side of the joining portions of the two conductors and applying a current between the two conductors with the two welding electrodes by increasing a temperature of the joining portions above a joinable temperature; and measuring a distance between the two conductors after the joining, and determining the joining quality based on a difference in distance between the two conductors before and after the joining.

The above-described object of the present invention is more effectively achieved by that wherein the two conductors are two metal plates for electrical connection, a projection is provided, at the joining portions of the two metal plates, on one end on a plate surface of either one of the two metal plates, facing the other metal plate, and the projection comprises a base and a projecting surface formed on a top part of the base; or wherein a plate surface of one of the two metal plates is a flat surface, and the projection is provided on a plate surface of the other facing metal plate; wherein the base of the projection is in a cylindrical shape, and the projecting surface is in a hemisphere shape formed on a top surface of the base; or wherein a projecting surface portion in a hemisphere shape formed on the top surface of the base is entirely melted in welding; or wherein the determination of the joining quality is made based on a comparison between the difference in distance between the two metal plates before and after the joining and a height of the projecting surface provided on the top part of the base; or wherein the determination of the joining quality is made based on a comparison between an area of the joining portion after the joining and a size of a sectional area of the two metal plates; or an electric power steering apparatus having a joining part of conductors formed by the above resistance welding method.

Furthermore, for resolving the above-described problems, the present invention provides a shape of a projection formed on an object to be welded for projection welding, wherein the projection includes a base and a projecting surface formed on a top part of the base, and provides the shape of the projection, wherein an outer peripheral surface of the base is coated with an insulator.

For resolving the above-described problems, the present invention provides a shape of the projection comprising the base, the projecting surface formed on the top part of the base, and further a recessed portion provided in a central portion of the projecting surface.

Effects of the Invention

With a resistance welding device and a resistance welding method according to an embodiment of the present invention, it is possible to measure a distance between conductors to be subjected to resistance welding at a joining area and determine quality of joining based on a difference in the distances before and after the joining. Further, an embodiment of the present invention makes it easy to form and measure the distances by such a projection shape as to easily generate a difference in the distances before and after the joining. Therefore, in a case where connecting terminals such as metal plates used for power devices, for example, are joined by the resistance welding, it is possible to carry out an appropriate joining, and after the joining, it is possible to ensure a distance between conductors to be joined and easily determine the joining quality based on the difference in the distances between the conductors before and after the joining.

With the shape of the projection of an object to be welded for the projection welding according to an embodiment of the present invention, it is possible, in the resistance welding device and the resistance welding method, to carry out the welding effectively and determine the joining quality by allowing securing an appropriate distance between the conductors before and after the joining.

Therefore, by using the resistance welding device, the resistance welding method, or the shape of the projection of the object to be welded for the projection welding, it is possible to further improve an electrical connecting reliability and a mechanical joining strength at the resistance welding portions such as a connecting part between terminals used for a feed line from FETs to a motor in devices such as an electric power steering apparatus (EPS) used for a vehicle.

BRIEF DESCRIPTION OF THE DRAWINGS

In the accompanying drawings:

FIGS. 1A and 1B are diagrams illustrating a schematic configuration according to an embodiment of the present invention, in which FIG. 1A is a conceptual view according to an embodiment of the present invention, and FIG. 1B is a side view of a projecting portion;

FIGS. 3A and 3B are schematic side views of a joining portion according to an embodiment of the present invention, in which FIG. 3A illustrates conditions before joining, and FIG. 3B illustrates conditions after joining.

FIG. 6B is a sectional view of a projection in an area of "K" described in FIG. 6A;

FIGS. 10A2 to 10E3 are views to illustrate exemplary shapes of other projections formed in a joining portion according to an embodiment of the present invention;

MODE FOR CARRYING OUT THE INVENTION

Embodiments of the present invention will be described below with reference to the drawings. In terms of descriptions of the drawings, part of overlapping representations and descriptions may be omitted appropriately. The drawings are schematic, and thus relations between thickness and planar dimensions of each component, scales and ratios among components and the like may be different from actual ones.

Figure 1A:
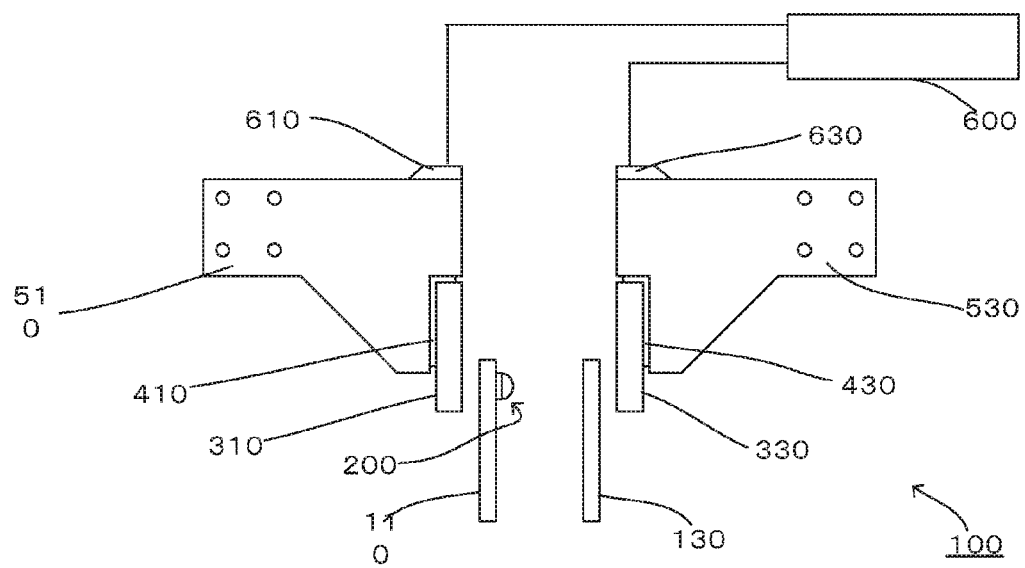
Figure 1B:
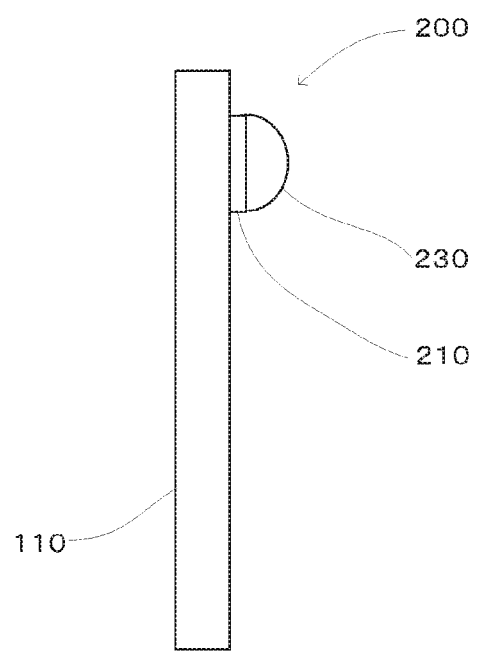

FIGS. 1A and 1B are conceptual diagrams illustrating a basic configuration of a resistance welding device 100 according to an embodiment the present invention. The resistance welding device 100 according to an embodiment of the present invention has configurations of basic parts similar to one that commonly used resistance welding devices have, and joins two conductors 110 and 130 to be joined. The two conductors (110, 130) to be joined are here represented as two rectangular-shaped parallel flat plates.

The two conductors (110, 130) face each other such that plate surfaces thereof are parallel to each other. At a portion where the two conductors (110, 130) are joined (joining portion), a projection 200 is provided on one end on the plate surface of the conductor 110 that is one of the two parallel flat plates in a rectangular shape, facing toward the other conductor 130. In the above embodiment, the two conductors (110, 130) have the plate surfaces facing in parallel to each other. However, the plate surfaces may not necessarily face in parallel to each other as described above, and can take a facing form corresponding to, for example, shapes of conductors at the joining portion. For example, in the present embodiment, a shape of a projecting surface 230 is, as will be described later, curve. Therefore, the plate surfaces can be joined without problems even when they are not necessarily in parallel. As described above, the two conductors (110, 130) may have one conductor 130 kept as a flat plate and the other conductor (110) provided with the projection 200, or may have both conductor plates provided with a projection.

Further, as described above, the projection 200 formed on the plate surface of the conductor 110 is, as illustrated in FIG. 1B, formed of a base 210 and the projecting surface 230 provided on a top part of the base 210 in a case where the plate surface of the conductor 110 is assumed to be a bottom part. A top surface of the base 210 is formed with some distance secured from the conductor 110 in order to prevent leak of a welding current during the welding. A shape of the base 210 is a cylindrical shape vertically provided with the plate surface of the conductor 110 as a bottom surface, and the projecting surface 230 is formed by a projecting surface in a hemisphere shape provided on the top surface of the base 210.

In the present invention, a combination of the base 210 and the projecting surface 230 in this way prevents destabilization of a current-applying sectional area and the leak of the welding current attributable to formation of the projecting surface only by a simple hemisphere shape, and prevents risks of instable contact between electrodes due to the largeness of a current-applying sectional area from the start attributable to formation of only the base on the plate surface of the conductor in, for example, a cylindrical shape, a poor welding caused in a case where less nuggets are generated in the welding portion attributable to the instability, and insufficient welding and damaged terminal when a gap after the welding is larger than an expectation.

The base 210 and the projecting surface 230 of the projection 200 are formed by, for example, stamping the conductor 110, but any particular limitation is not set to a method for the formation, and the projection 200 may be formed in advance in manufacturing the conductor 110.

Further, in a case where the projection 200 is formed by the stamping, a recessed surface in a shape largely similar to the projection 200, corresponding to the projection 200 is formed on a back surface of the joining portion of the conductor 110 where the projection 200 is provided.

Figure 11A:
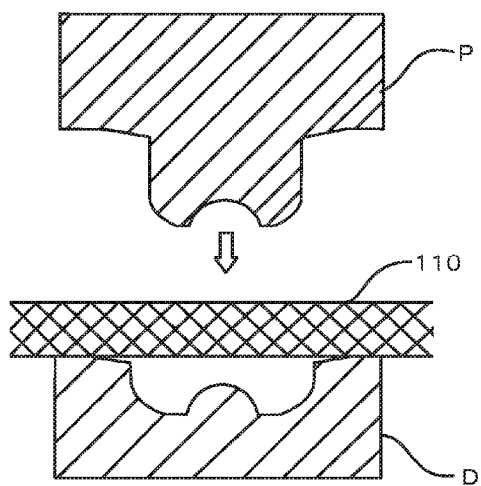
FIGS. 11A and 11B are conceptual diagrams illustrating exemplary formation of a projection by stamping.
Figure 11B:
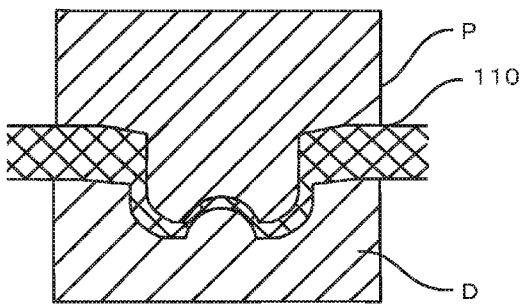

For example, FIGS. 11A and 11B are schematic views of a punch P used for half-punching and a die D used in combination with the punch P. Here, FIG. 11A is a sectional side view of an exemplary configuration where the conductor 110 before the stamping is arranged between the punch P and a part of the die D of a stamping device. FIG. 11B is a sectional side view of the conductor 110 stamped by operating the punch P in a direction of an outlined arrow in FIG. 11A. In FIGS. 11A and 11B, other parts of the stamping device are omitted.

In a case where the projection 200 used in an embodiment of the present invention is formed, for example, a shape largely similar to the shape of the projection 200 is formed on a head side (a side pressed into the die D) of the punch P, a recessed surface in a largely similar shape that fits into the projection shape formed on the punch P through the conductor 110 is formed on the die D used in combination with the punch P, and then a press molding is carried out with the plate surface of the conductor 110 sandwiched between the punch P and the die D.

When the projection is formed by using this sort of means, the projection 200 is, as described above, formed on the plate surface (in a case where a lower side in the drawing is regarded as a surface side, the surface side) of the conductor 110, and a recessed surface corresponding to the shape of the punch P that has formed the projection 200 is formed on a rear surface side thereof.

In a case where the recessed surface is formed, it is also possible to reduce effects of changes in volume when solid solution is formed at the joining portion by applying a current by means of the resistance welding device and prevent to more generate excessive deformation or distortion than necessity through the joining portion for the two conductors.

The shape of the projection formed by, for example, the punch P and the die D used for the half punching, for example, and a shape of a recessed portion fitted thereinto are based on a shape similar to the shape of the projection 200. However, a size thereof, for example, is determined after an appropriate adjustment so as not to cause fracture, crack or the like by, for example, formation of a thin-thick portion by the punching on the projection 200 formed on the plate surface of the conductor 110 in accordance with a plate thickness of the conductor 110 to be used, the shape of the projection 200, a height of the projection 200 from the plate surface of the conductor 110, a punching amount of a pressing device, a retracting amount of the conductor 110 by the punch P and the like. In a case where the recessed surface which will be described later is formed at a tip of a convex surface of the projection 200, the recessed surface is also formed, as illustrated in FIGS. 11A and 11B, on the head of the punch P, and on the die D corresponding thereto, the projecting surface is formed at the corresponding portion.

Referring back to FIGS. 1A and 1B for continuing with the description, the two electrodes (310, 330) are arranged on back surface sides of the plate surfaces at the joining portion of the two conductors (110, 130) such that the two conductors (110, 130) can abut on each other by being sandwiched from both sides and then be pressed in a direction where the joining portion is sandwiched.

These two electrodes (310, 330) are both connected to an unillustrated power source circuit, and indirectly supported by two electrode supporting members (410, 430) to support each of the electrodes (310, 330) and two pressurization assist members (510, 530) to further support each of the electrode supporting members (410, 430) and to press the joining portion.

Further, although the two pressurization assist members (510, 530) are, as described above, members that press the joining portion through the electrodes (310, 330), it makes no difference whether either one of them is driven for pressing the two conductors (110, 130), or whether both of them are driven for pressing the two conductors (110, 130). Furthermore, it does not matter whether the power source circuit and a power source supplied thereto are alternate current, direct current or pulse current, as long as they are typically used for the resistance welding, and any particular limitation is not set to output wavelength.

In the resistance welding device according to an embodiment of the present invention, a distance measuring section 600 is further provided in order to measure a distance between the two conductors (110, 130).

The distance measuring section 600 measures distances between the two conductors (110, 130) before and after the joining, records the measured values, and evaluates, based on the measured values, joining by using a method which will be described later.

From the distance measuring section 600, distance measuring sensors (610, 630) are connected to the two pressurization assist members (510, 530). The sensors optically measure a distance between the two pressurization assist members (510, 530), through which the distance between the two conductors (110, 130) is measured as described above. The sensors indirectly measure the distance between the two conductors (110, 130) based on the distance between the pressurization assist members (510, 530). However, the distance measuring sensors may have any configuration as long as they can measure the distances, and a limitation is not set to a mounting place thereof. Therefore, the sensors may have any configuration including one where the distance between the two conductors (110, 130) is directly measured.

Figure 2:
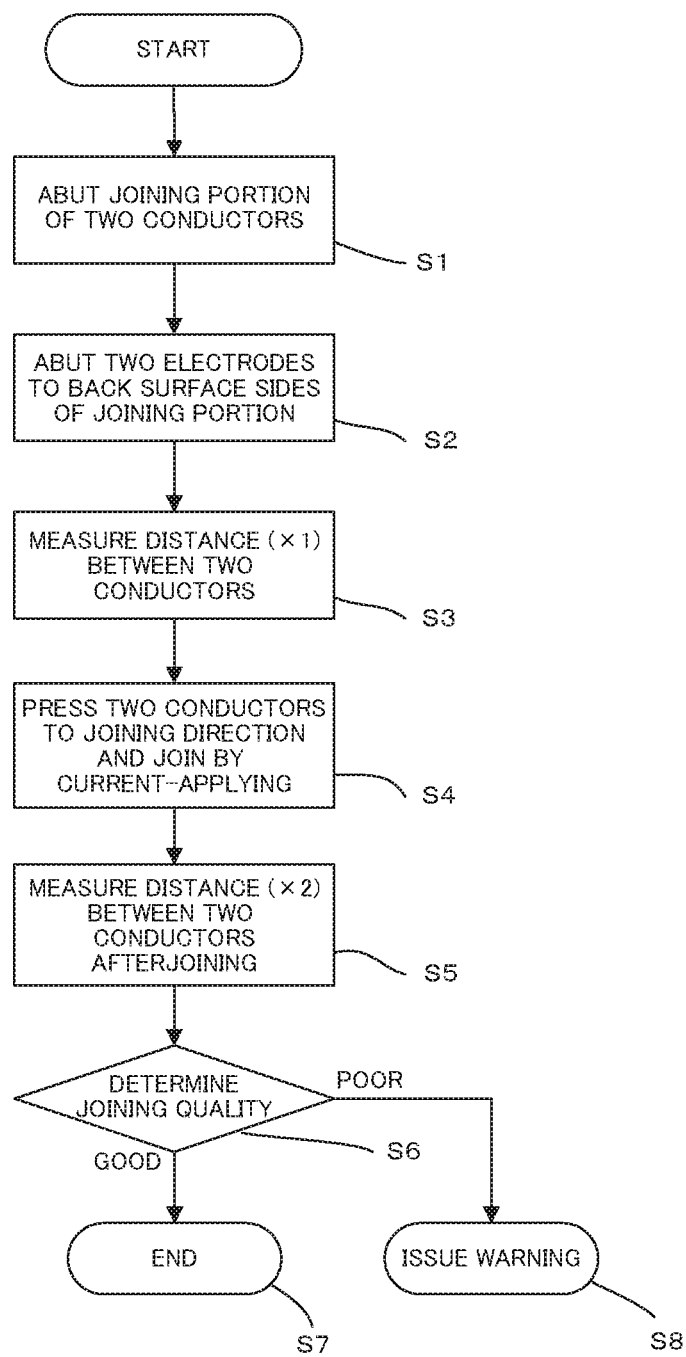
FIG. 2 is a flowchart of a resistance welding method according to an embodiment of the present invention.

In the resistance welding device having the configuration described above, as illustrated in a flowchart in FIG. 2, the resistance welding is carried out and then the joining quality is determined as follows.

First, the two conductors (110, 130) are made to abut on each other through the projection 200 provided on the joining portion (Step S1), and the two electrodes (310, 330) are made to abut on each other on the back surface sides of the joining portion so as to sandwich the two conductors (Step S2).

Next, a distance X1 between the two conductors (110, 130) is measured by means of the distance measuring section 600 and the measured value is stored in a storage section in the distance measuring section 600 (Step S3).

Then, the pressurization assist members (510, 530) are operated for pressing the two electrodes (310, 330) so as to narrow the distance from the two conductors (110, 130). Along with the pressing or at a time when a pressing force reaches to a certain level, a current is applied between the two electrodes (310, 330) for generating Joule heat on the projecting surface 230 of the projection 200 between the two conductors (110, 130) and carrying out the joining between the two conductors (110, 130) (Step S4).

Figure 12:
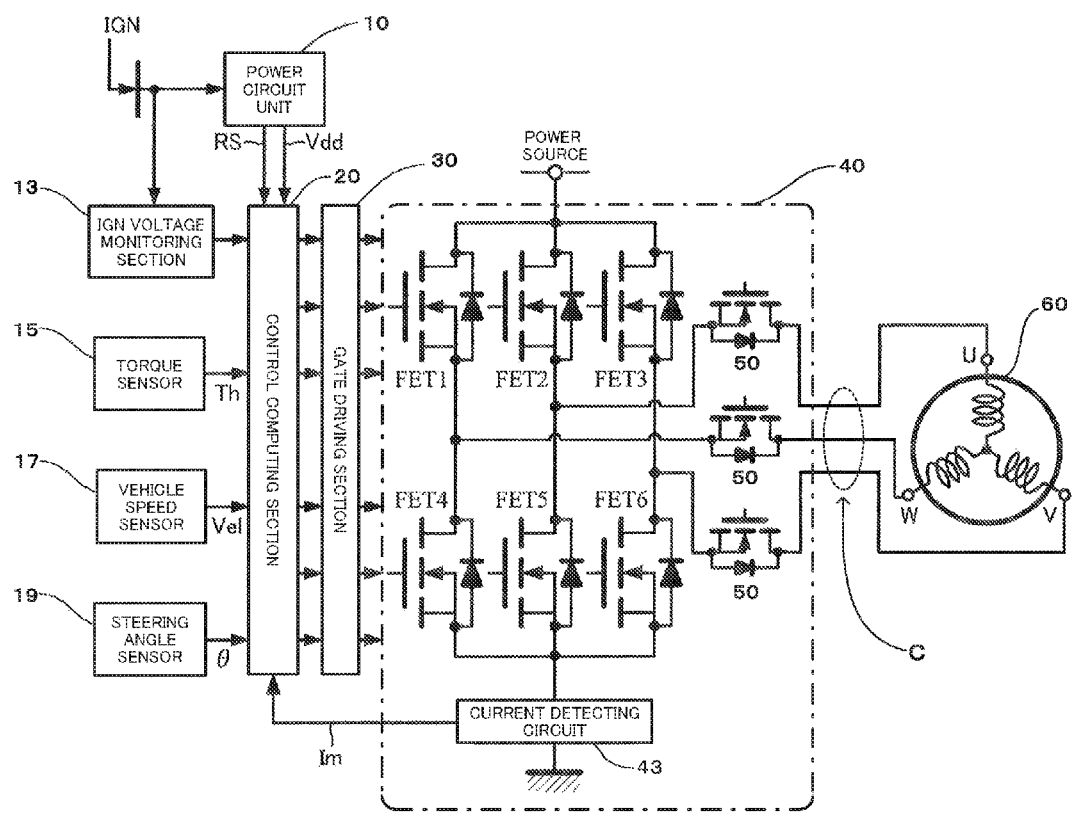
FIG. 12 is a basic configuration diagram including a partial circuit diagram of a control unit of an electric power steering apparatus.

At this time, in a case where the projecting surface 230 is, for example, formed in a hemisphere shape, it is possible to melt the entire projecting surface part by the pressing and the current-applying, solidify and join the melted part by ending the current-applying when the two conductors (110, 130) mutually approach the top part of the base 210, make a gap that has been formed by a part of the projecting surface part 230 zero, and form the gap between the conductors so as to be left by an equivalent of a height of the base 210. By leaving the base 210 in this way, it is possible to secure a sectional area required for the current-applying between terminals by an equivalent area on a surface of the conductor on which the base 210 is vertically provided, and to stabilize the current-applicability between the terminals. Therefore, as a result of stabilized internal resistance, for example, in a case where the joining between the two conductors (110, 130) is used for connecting the terminals used for the current supply line C from FETs to the motor of the electric power steering apparatus in an ellipse illustrated by an arrow in FIG. 12, it is possible to stabilize a torque of the motor by stabilizing each of the three-phase (U, V, W) currents and eliminate a sense of discomfort in the steering. It is also possible to suppress an amount of heat generation due to a high current at the connecting part between the terminals.

In this case, when appropriate conditions beyond the above are set, it is also possible to leave a part of the projecting surface 230 and the part of the base 210 of the projection 200. Thus, in a case where the part of the projecting surface 230 and the part of the base 210 are left without the joining by welding, when a recessed surface with the press molding is formed on the rear surface side of the projection 200, the part of the recessed surface is left unmelted.

Thereafter, a distance X2 between the two conductors (110, 130) after the joining is measured by the distance measuring section 600 (Step S5), and the measured value is compared with the distance X1 between the two conductors (110, 130) before the joining stored in the storage section for determining the joining quality as follows (Step S6).

That is, as described above, mutual relations between the distances X1 and X2 between the two conductors (110, 130) before and after the joining and a diameter Y1 of the base in the cylindrical shape are illustrated in FIG. 3A before the joining and in FIG. 3B after the joining. Here, the two conductors (110, 130) face each other in parallel before and after the joining, but they may not, as described above, necessarily face each other in parallel.

Thus, based on the above instrumentation, in a case where a difference in the distances between the two conductors before and after the joining is assumed to be squeeze (compression margin) Δ due to the joining, the squeeze Δ is "Δ=X1−X2".

In a case where a height of the part of the hemisphere projecting surface 230 of the projection 200, vertically measured from the top surface of the base 210 to the tip of the projecting surface, is assumed to be "L", it is possible to confirm that the joining has been carried out at the part of the projecting surface 230 of the projection 200 as long as the squeeze Δ fulfils a relation "0<Δ<L". Furthermore, in a case where the height from the plate surface of the conductor 110, on which the base 210 is provided, to the top surface of the base 210 is assumed to be "h", it is possible to confirm that the joining is carried out over the part of the base 210 beyond the part of the projecting surface 230 as long as the squeeze Δ fulfils a relation "L<Δ<L+h". Therefore, considering this within a stable zone, the joining can be determined as good.

That is, in a case where the joining of the two conductors (110, 130) is thus carried out over the part of the base 210 beyond the part of the projecting surface 230, it is possible to perceive that the part of the projecting surface 230 is completely melted and joined and a melted surface reaches the base 210. Therefore, by bringing the melted surface to the base 210, it is possible, as described above, to secure the sectional area required for the current-applying between the terminals by an equivalent of the area on the surface of the conductor, on which the base 210 is vertically provided, and stabilize the current-applying between the terminals for further improving an electrical connecting reliability and a mechanical joining strength.

As another evaluation method, it is possible to evaluate a quality determination by using the following means. Namely, at a position on the projecting surface 230, parallel to the top surface of the base 210, a section of the projecting surface 230 is formed in a shape (circle in the present embodiment) similar to a bottom surface of the projecting surface 230 on the base 210. Thus, the sectional shape of the part of the projecting surface 230 at a position where the joining is carried out is circle in the present embodiment. Therefore, it is possible to know a diameter Y1 of the circle based on a size of the squeeze Δ. Thus, based on the diameter Y1, it is possible to know that an area S of the joining portion at the joining part is "$S=2\pi(Y1/2)^2$". In this connection, it is also possible to evaluate the quality of the joining portion in this way by, for example, a comparison with sectional areas of short side parts of the two conductors (110, 130) in a rectangular shape based on the area S of the joining portion at the part of the projecting surface 230 of the projection 200 in accordance with nature and uses of the conductors to be joined. Even in a case where a recessed portion or a portion in a hollow cone shape which will be described later is formed on the projecting surface 230, it is possible to geometrically calculate the area of the squeeze similarly to the above and evaluate the quality of the joining portion similarly to the above. In addition, as described above, in a case where melting for the joining is carried out to a position of the base 210, it is possible to similarly calculate geometrically the area of the squeeze based on a projected area of the base onto the surface of the conductor.

Base on the quality determination, if the joining is determined as good, a joining process is finished (Step S7). If the joining is determined as poor, a warning is issued by, for example, an informing device separately provided (Step S8).

The above description illustrates an exemplary embodiment of the present invention, and the present invention is not limited to the above configuration and can be implemented in various forms without departing from the spirit of the present invention.

For example, the shape of the projection 200 is not limited to that described above, and the shapes of the base 210 and the projecting surface 230 constituting the projection 200 are not limited to those described above.

That is, it is only necessary that the shape of the base 210 allow the part of the projecting surface 230 to be formed with some distance secured from the plate surface of the conductor, and any shape is acceptable as long as boundary portions between an outer edge of the top surface of the base 210 and an outer edge of an underside of the projecting surface 230 directly and smoothly contact with each other in an identical curve. Therefore, the shape of the base 210 is not limited to the above, and a shape of an outer periphery of the base 210, that is, a shape of an edge in a direction perpendicular to a direction of the top surface, on which the projecting surface 230 is provided, of the base 210 is not limited to the circle. Consequently, it is only necessary that the shape of the base 210 be basically a smooth closed curve based on, for example, an ellipse or a polygon in order to prevent a welding current from being discharged from points other than a point where a curvature of the projecting surface 230 is the maximum in carrying out the resistance welding.

Figure 4:
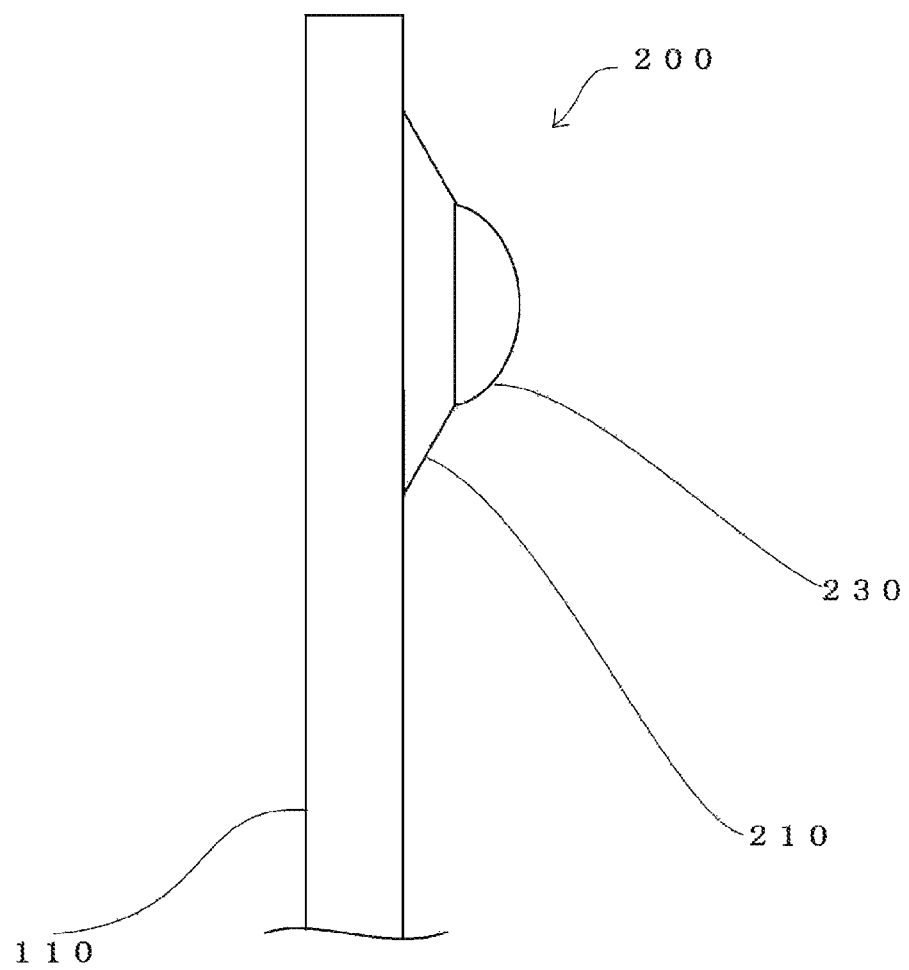
FIG. 4 illustrates an exemplary configuration in a case where a base portion of a projection and a conductor are not vertically in contact with each other.
Figure 9A:
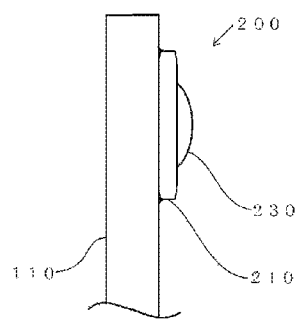
FIGS. 9A to 9D are views to illustrate exemplary shapes of other bases formed according to an embodiment of the present invention.

The base 210 is, in the above embodiment, vertically provided in a direction perpendicular to the surface of the conductor and formed on the projecting surface 230. However, the base 210 may not necessarily be vertically provided perpendicular to the surface of the conductor as long as the base 210 is formed smoothly from the surface of the conductor. As illustrated in FIG. 4, the base 210 may be provided with a taper at a slope different from a slope of the projecting surface 230 as long as the boundary portions are smoothly formed. Similarly, therefore, as long as the boundary portions are smoothly formed, the base 210 and the projecting surface 230 may be formed uneven as illustrated in FIG. 9A.

Figure 9B:
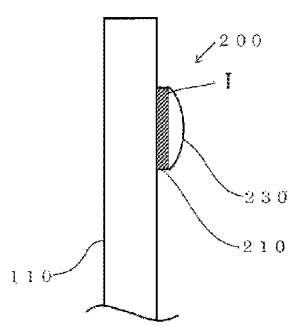
Figure 9C:
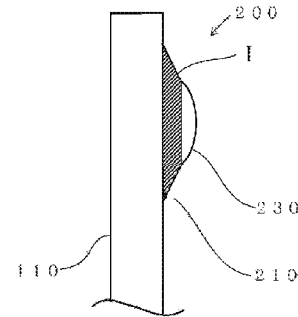
Figure 9D:
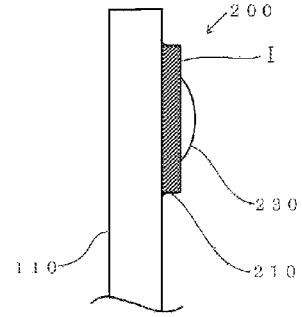

Furthermore, it is possible to coat an outer peripheral surface of the base 210 with an insulator I as shown in FIGS. 9B to 9D for preventing the welding at more than intended joining areas and an application or a discharge of a welding current from areas other than the projecting surface 230 and making the distance between the joined conductors after the resistance welding easy to secure.

Figure 5A:
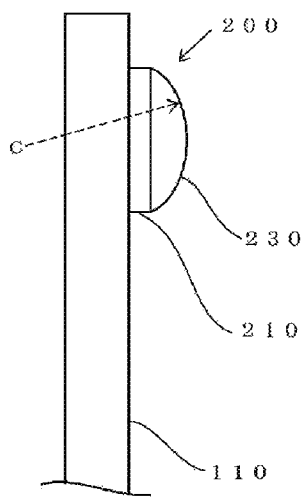
FIGS. 5A to 5E are views to exemplify a shape of a projection formed on a joining portion according to an embodiment of the present invention.
Figure 5B:
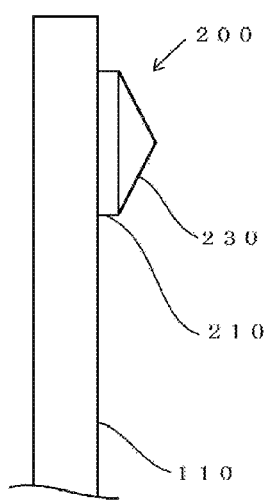
Figure 5C:
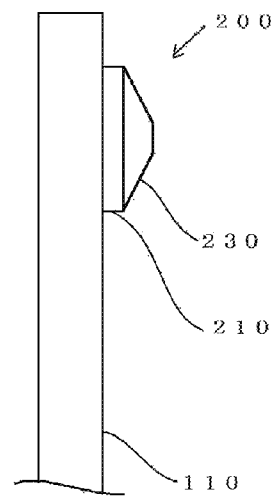
Figure 5D:
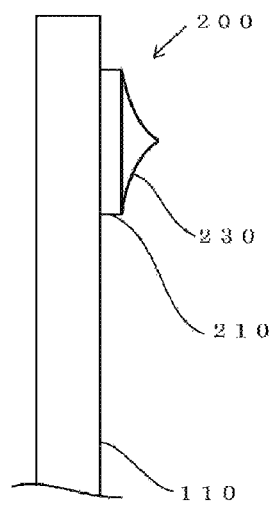
Figure 5E:
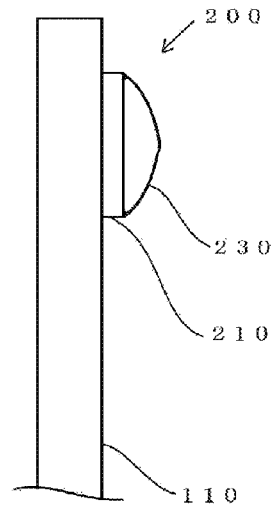

The projecting surface 230 formed on the top part of the base 210 is not limited to a hemisphere shape as described above, and any particular limitation is not set to the shape as long as a shape of a tip portion of the projecting surface 230 is not crushed or easily deformed in consideration of, for example, materials when the joining part is pressed by the resistance welding device, has a convex portion where a current can concentrate during the current-applying, and is smoothly connected to the base 210. Therefore, for example, as FIGS. 5A to 5E show side views, the shape of the projecting surface 230 may include a sphere (FIG. 5A) where a center of curvature is on a conductor side from the top surface of the base 210, a cone (FIG. 5B), a conic base (FIG. 5C), one where a side surface of the cone or the conic base forms a recessed surface from an outer periphery of a bottom surface portion to a tip thereof (FIG. 5D), and one where a projecting surface is formed (FIG. 5E).

Furthermore, the shape of the projecting surface 230 may include, on a top surface of the sphere (FIG. 5A), the cone (FIG. 5B), the conic base (FIG. 5C), the one where a side surface of the cone or the conic base forms a recessed surface from an outer periphery of a bottom surface portion to a tip thereof (FIG. 5D), and the one where a projecting surface is formed (FIG. 5E), one where a recessed portion, a section of which is illustrated with a dotted line in FIGS. 10A2, 10C2, 10D2, 10E2, 10A3, 10C3, 10D3 and 10E3, is provided and a tip portion of the projecting surface 230 is formed into a hollow cone shape (FIGS. 10A2, 10C2, 10D2, 10E2), or may additionally include one where the top surface of the hollow cone is formed into a flat surface (FIGS. 10A3, 10C3, 10D3, 10E3).

Figure 6A:
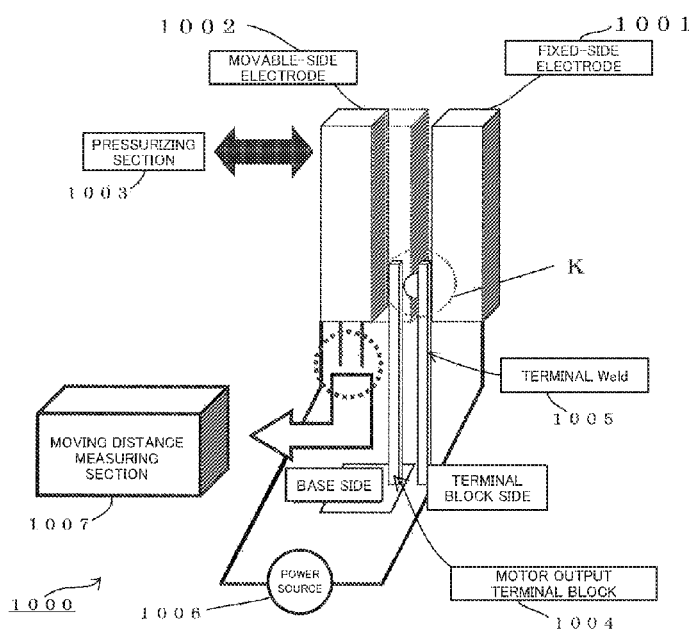
FIGS. 6A and 6B are diagrams to illustrate a schematic configuration of an example 1000 of the present invention.
Figure 6B:
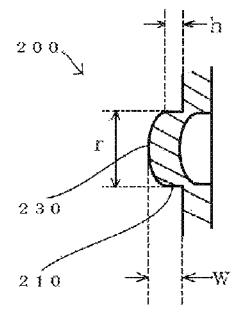

Next, an example of the present invention will be described below. FIG. 6A is a conceptual diagram showing the resistance welding device according to an example 1000 of the present invention, and FIG. 6B is an enlarged sectional view of an area surrounded by "K" in FIG. 6A. A basic configuration of the example 1000 is similar to one illustrated in FIGS. 1A and 1B.

Figure 7:
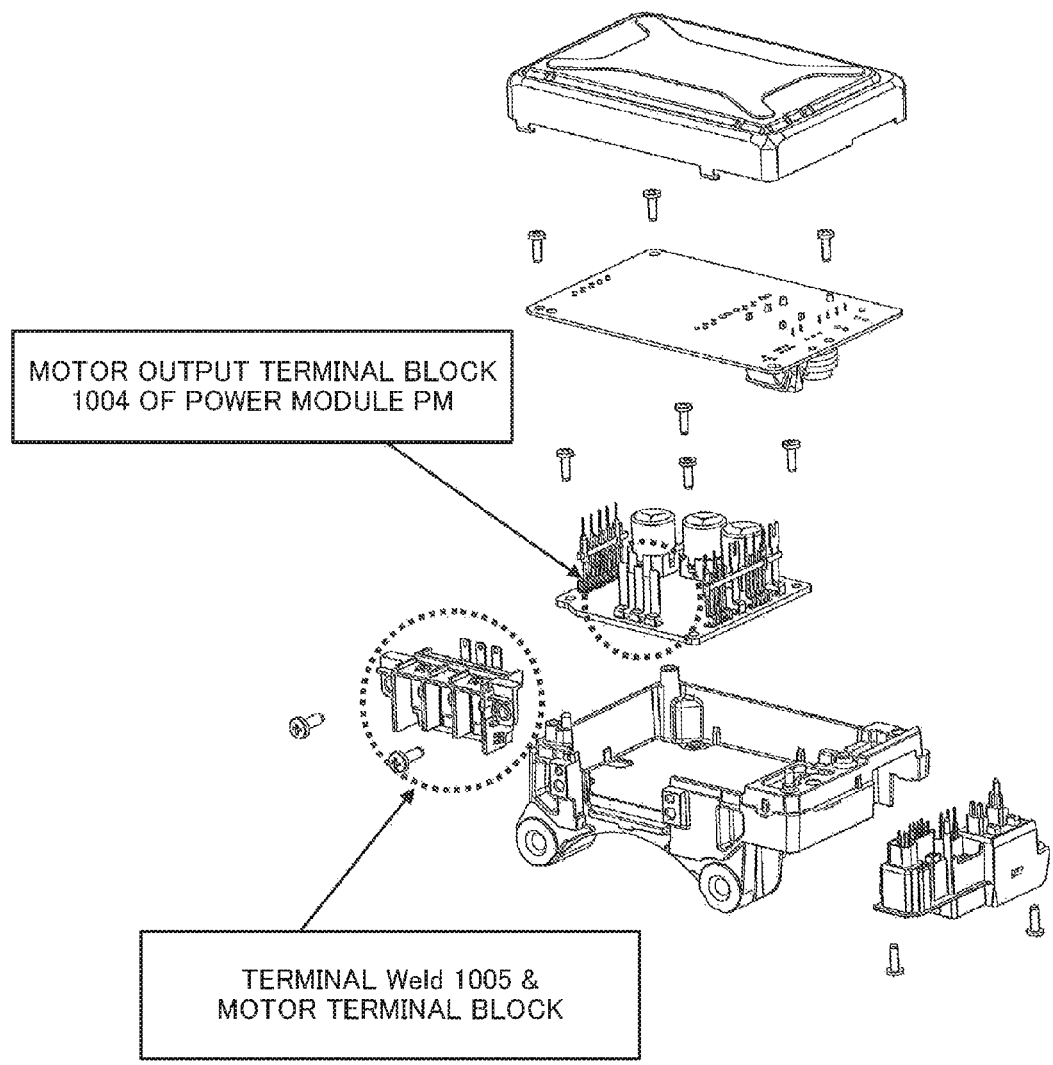
FIG. 7 is a schematic perspective view of a power module PM and a motor terminal block MT of an electric power steering subjected to resistance welding according to an example 1000 of the present invention.

The resistance welding device 1000 shown in FIGS. 6A and 6B is, in a power module PM of an electric power steering illustrated in FIG. 7, used for electrically connecting motor output wiring on a power module substrate to a motor terminal block MT. More specifically, the resistance welding device 1000 connects, by using a resistance welding method, a motor output terminal block 1004 (copper plate) from the power module PM substrate and a terminal Weld 1005 (copper plate) from the motor terminal block MT, which are equivalent to electrodes for output terminals (UT, VT, WT) from FETs and a motor terminal block as exemplified in FIG. 12 and FIGS. 13A to 13C.

In the resistance welding device 1000, the projection 200 is formed on a plate surface of the terminal Weld 1005, by joining this portion, the electrical connection and the mechanical joining strength at a joining part are secured. A shape of the projection 200 provided on the terminal Weld 1005 is formed in two layers, a cylindrical part constituting the base 210 as a straight-shaped part and the projecting surface 230 in a hemisphere shape provided thereon.

FIG. 6B is an enlarged sectional view of the projection 200 formed on the terminal Weld 1005. In the present example, a height (thickness) w of the entire projection part 200 is assumed to be 0.5 [mm], a thickness (height) h of the base 210 is assumed to be 0.28 [mm], and a diameter r of a cylindrical shape constituting the base 210 is assumed to be 2.0 [mm].

In the present example 1000, a fixed-side electrode 1001 which is made to abut on the terminal Weld 1005 is fixed, and a movable-side electrode 1002 is movable. The movable-side electrode 1002 can reduce a distance from the fixed-side electrode 1001 by means of a pressurizing section 1003. The movable-side electrode 1002 and the fixed-side electrode 1001 are connected to a power source 1006 which supplies a welding current. In a case of the present example, a direct current inverter is connected as the power source, and a direct current is supplied to the electrodes through a welding transformer or a rectifier.

A moving distance measuring section 1007 (equivalent to the distance measuring section 600 in the above embodiment) is connected to the movable-side electrode 1002, and can measure changes in distance from the fixed-side electrode 1001 due to movement of the movable-side electrode 1002 by means of the pressurizing section 1003, and a squeeze of the projection by measuring moving distances between both electrodes before and after the current-applying and the pressurization. More specifically, the moving distance measuring section 1007 has a function of measuring an inter-electrode distance based on the height of the base 210 of the projection 200 formed on one end of the terminal Weld 1005 and a projection amount of the projecting surface 230 before the joining and an inter-electrode distance after the welding (difference in projection amount described above), and measures, stores and compares these values.

Next, a welding method by the resistance welding device 1000 according to the above example will be described below.

The welding method in the present example is also basically similar to that described in the above embodiment, but first, the terminal Weld 1005 (mounted on the motor terminal block) is brought into contact with the fixed-side electrode 1001 (made of tungsten, for example) and the movable-side electrode 1002 (made of tungsten, for example) is brought into contact with the motor output terminal block 1004.

At this time, a slight elastic deformation is caused between the both electrodes, but the moving distance measuring section 1007 of inter-electrode stroke is operated for zero-resetting memory of positions.

Then, the terminal Weld 1005 and the motor output terminal block 1004 are pressed in a joining direction while being sandwiched with a specified pressure (165 [N]).

Next, the current-applying is started from the power source 1006 between the electrodes and a high current is applied. An impressed current at this time is 4,000-5,000 [A], and an impressed time is around 40-50 [ms]. A pathway the high current flows along is in order of "the power source 1006→the fixed-side electrode 1001→the terminal Weld 1006→the motor output terminal block 1005→the movable-side electrode 1002→the power source 1006→return".

At a welding area, a shape of a tip of the projection is hemisphere. Therefore, with the current-applying, a high current concentrates at the tip of the projection part in a hemisphere shape (the electrode 1004 of the motor output terminal block on the other side is a flat surface), which leads to melting even at a copper member for instant welding, but the current-applying ends in about 50 [ms].

Thereafter, in order to determine quality of the welding based on the squeeze of the projecting surface 230 of the projection 200, a moving distance from the position zero-reset at the moving distance measuring section 1007 is measured after the end of the current-applying.

That is, it is confirmed based on the measured values that the projecting surface 230 (hemisphere surface) in the shape of the projection 200 is, as illustrated in FIGS. 3A and 3B, melted and moves into an area of the cylindrical part of the base 210.

More concretely, similarly to the descriptions of the above embodiment, a shortest distance from the sphere shape of the tip part of the terminal Weld 1005 to the area of the cylindrical part is defined as "L", and assuming that L=0.22 [mm], the following relation will be established.

A secured current-applying area (area of a portion of the cylinder part (base part) of the terminal Weld 1005, parallel to a plate surface of the terminal Weld 1005) - - -

$S = 2\pi(Y1/2)^2$

A terminal Weld squeeze (difference between the electrodes before and after the joining) - - -

$\Delta = X1 - X2$

Thus, when a stable zone is defined as "L<Δ<L+h", it is possible to determine whether the squeeze Δ is within a stable zone based on the measured value, and it is possible to determine the joining quality by means of the resistance welding device 1000 according to an example of the present invention based on the secured current-applying areas and/or whether the squeeze Δ is within the stable zone.

The above description illustrates an example of the present invention, and the present invention is not limited to the above configuration and can be implemented in various forms without departing from the spirit of the present invention.

Figure 8A:
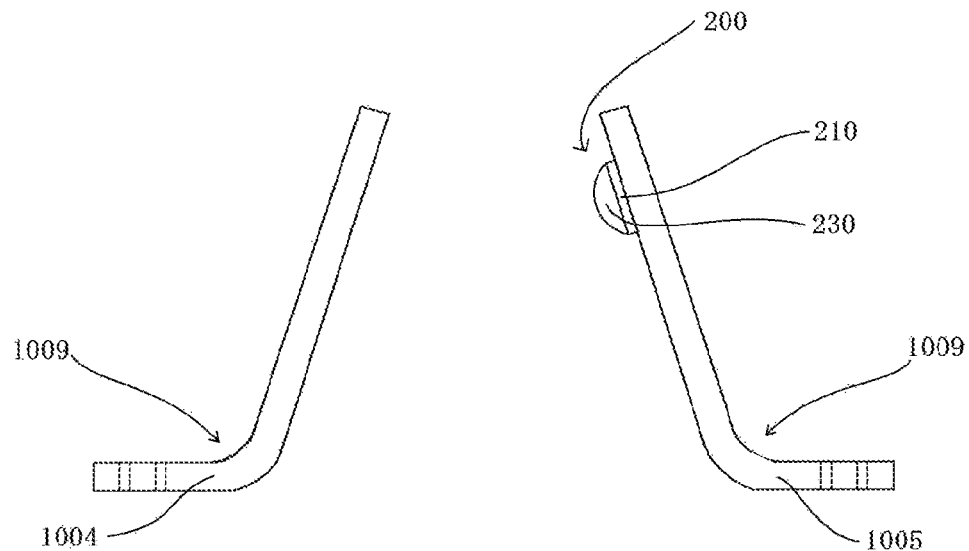
FIGS. 8A and 8B are side views of exemplary elastic electrodes to be joined.
Figure 8B:
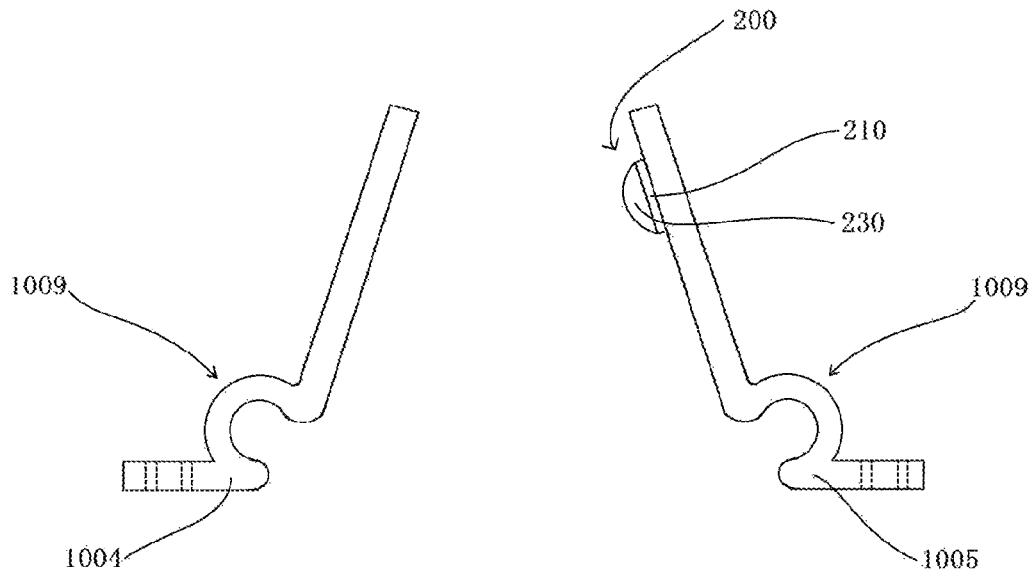
Figure 13A:
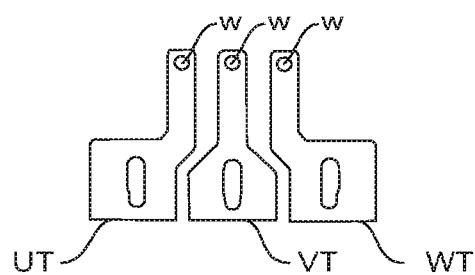
FIGS. 13A to 13D are diagrams illustrating exemplary connecting terminal used for connecting a current supply line C in an ellipse in FIG. 12.
Figure 13B:
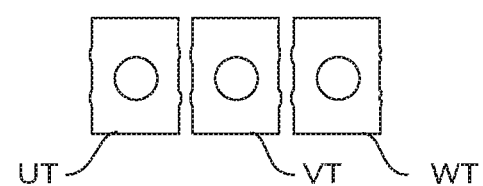
Figure 13D:
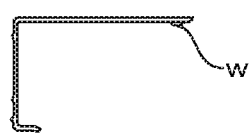
Figure 13C:
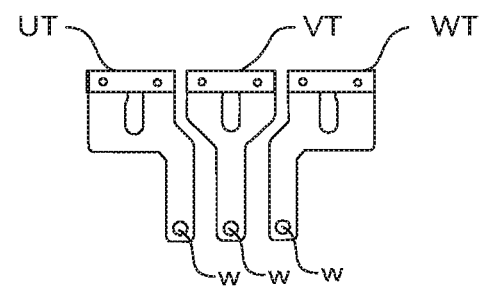

For example, in the above example, the movable electrode is brought into a contact with the terminal and moved by being pressurized for pressing the joining portion. However, as illustrated in side views of FIGS. 8A and 8B, for example, the terminal Weld 1005 and the motor terminal block 1004 can be brought into the contact with each other in advance by elasticity above a certain level based on their respective shapes by using a method such as providing a plate spring-shaped portion 1009 on a portion closer to a bottom surface portion of the connecting terminal as illustrated in FIG. 13D. In a case where such a configuration is adopted, when the resistance welding is carried out, the joining portions press against each other with a mutual elasticity. Therefore, it is possible to eliminate a pressurizing section 1003 having the above configuration by connecting the electrodes from the power source such that they can follow the movement in the joining of the terminal Weld 1005 and the motor terminal block 1004, or it is possible to reduce a load on the pressurizing section 1003 in the above configuration.

Further, describing effects during the welding with an outer peripheral surface of the base 210 coated with the insulator (for example, FIG. 9B) as a shape of a projection such as a fixed electrode, coating with the insulator prevents the welding at more than intended joining areas, and the applying and the discharging of the welding current from areas other than the projecting surface 230, and allows a distance between the joined conductors after the resistance welding to be easily secured.

In addition, describing effects during the welding in a hollow cone shape with a recessed portion provided in a central portion of a sphere projection (for example, FIG. 10A2) as a shape of a projection such as a fixed electrode, a resistance on a contact surface between the hollow cone-shaped projection shape and an object to be welded is small compared with a shape without a recessed portion. However, the resistance welding is carried out with an increase in current density of the flowing current for the less contact area. Unlike point contact in the sphere projection shape, the contact is in a hollow cone-shaped fine line. Therefore, heat generated at the hollow cone-shaped projection causes the hollow cone-shaped projection shape to start plastic flow and even a contact site of the object to be welded to plastically fluidize. In this point contact in the sphere projection shape, the heat is transferred only outward, but the heat generated at the hollow cone-shaped projection is transferred not only toward the outside of the hollow cone shape but also to a surface area thereof (inside the hollow cone shape). As a result, the heat balance is improved and good welding quality can be obtained.

EXPLANATION OF REFERENCE NUMERALS 10 power circuit unit
13 IGN voltage monitoring section
15 torque sensor
17 vehicle speed sensor
19 steering angle sensor
20 control computing section
30 gate driving section
40 motor driving section
43 current detecting circuit
50 cutoff circuit
60 motor
100 1000 resistance welding device
110 130 conductor to be joined
200 projection
210 base of projection
230 projecting surface of projection
310 330 electrode
410 430 electrode supporting member
510 530 pressurization assist member
600 distance measuring section
610 630 distance measuring sensor
1001 fixed-side electrode
1002 movable-side electrode
1003 pressurizing section
1004 motor output terminal block
1005 terminal Weld
1006 power source
1007 moving distance measuring section
1009 plate spring-shaped portion
X1 distance between conductors before joining
X2 distance between conductors after joining
Δ squeeze
L height from top surface of base
h height from surface of conductor
Y1 diameter
S area
I insulator
PM power module
P punch
D die
C current supply line
W welding part
UT U-phase electrode
VT V-phase electrode
WT W-phase electrode

The invention claimed is:

1. A resistance welding device that performs joining of two conductors by resistance welding, comprising:
at least a measuring section that measures a distance between said two conductors and determines quality of said joining; and
two welding electrodes for sandwiching the two conductors from a back side of a joining portion of the two conductors, pressing along a joining direction, and energizing the two conductors,
wherein said two conductors are two metal plates for electrical connection,
wherein a projection is provided on one end on a plate surface of either one of said two metal plates, facing an other metal plate,
wherein said projection comprises a base and a projecting surface formed on a top part of said base,
wherein said base extends in a direction perpendicular to said metal plate,
wherein an outer peripheral surface of said base is coated with an insulator,
wherein a recessed surface corresponding to said projection is formed on a back surface of said plate surface at a part, on which said projection is provided, of the metal plate provided with said projection,
wherein, in said recessed surface, a portion that extends from a back surface of a plate surface of said metal plate to an inner peripheral surface of said base, forms a continuous surface perpendicular to said plate surface of said metal plate,
wherein a projecting surface portion with a hemisphere shape, formed on said top surface of said base is entirely melted in welding,
wherein said measuring section:
measures a first distance between flat portions of the metal plates that face each other when said projection of the metal plate is brought into contact with the other metal plate before the joining, measures a second distance between the flat portions of the metal plates that face each other after the joining, and measures a difference between the first distance and the second distance, wherein said measuring section determines the joining quality based on the difference between the first distance and the second distance, and a height of said projecting surface provided on said top part of said base.

2. The resistance welding device according to claim 1, wherein said determination of said joining quality at said measuring section is made based on a comparison between an area of said joining portion after said joining, and a size of a sectional area of said two metal plates before said joining.

3. The resistance welding device according to claim 1, wherein said base of said projection is in a cylindrical shape, and said projecting surface is in a hemisphere shape formed on a top surface of said base.

4. The resistance welding device according to claim 3, wherein said determination of said joining quality at said measuring section is made based on a comparison between an area of said joining portion after said joining and a size of a sectional area of said two metal plates before said joining.

5. The resistance welding device according to claim 1, wherein a plate surface of one of said two metal plates is a flat surface, and said projection is provided on a plate surface of another facing metal plate.

6. The resistance welding device according to claim 5, wherein said base of said projection is in a cylindrical shape, and said projecting surface is in a hemisphere shape formed on a top surface of said base.

7. The resistance welding device according to claim 5, wherein said determination of said joining quality at said measuring section is made based on a comparison between an area of said joining portion after said joining and a size of a sectional area of said two metal plates before said joining.

8. A resistance welding method for joining two conductors by resistance welding, comprising steps of:
   at least, making joining portions of said two conductors abut on each other;
   measuring a distance between flat portions of said two conductors that face each other;
   joining said two conductors by pressing said joining portions of said two conductors in a joining direction by two welding electrodes that sandwich said two conductors from a back surface side of said joining portions of said two conductors and applying a current between said two conductors with said two welding electrodes by increasing a temperature of said joining portions above a joinable temperature; and
   measuring a distance between the flat portions of said two conductors that face each other after said joining, and
   wherein said two conductors are two metal plates for electrical connection,
   wherein a projection is provided, at said joining portions of said two metal plates, on one end on a plate surface of either one of said two metal plates, facing another metal plate,
   wherein said projection comprises a base and a projecting surface formed on a top part of said base,
   wherein said base extends in a direction perpendicular to said metal plate,
   wherein an outer peripheral surface of said base is coated with an insulator,
   wherein a recessed surface corresponding to said projection is formed on a back surface of said plate surface at a part, on which said projection is provided, of the metal plate provided with said projection,
   wherein, in said recessed surface, a portion that extends from a back surface of a plate surface of said metal plate to an inner peripheral surface of said base and said inner peripheral surface of said base, forms a continuous surface perpendicular to said plate surface of said metal plate,
   wherein a projecting surface portion with a hemisphere shape formed on said top surface of said base is entirely melted in welding,
   wherein a joining quality is determined based on a difference in distance between the flat portions of said two conductors before and after said joining.

9. The resistance welding method according to claim 8, wherein said determination of said joining quality is made based on a comparison between an area of said joining portion after said joining and a size of a sectional area of said two metal plates before said joining.

10. The resistance welding method according to claim 8, wherein said determination of said joining quality is made based on a comparison between said difference in distance between the flat portions of said two metal plates before and after said joining and a height of said projecting surface provided on said top part of said base.

11. The resistance welding method according to claim 8, wherein said base of said projection is in a cylindrical shape, and said projecting surface is in a hemisphere shape formed on a top surface of said base.

12. The resistance welding method according to claim 8, wherein a plate surface of one of said two metal plates is a flat surface, and said projection is provided on a plate surface of another facing metal plate.

13. The resistance welding method according to claim 12, wherein said base of said projection is in a cylindrical shape, and said projecting surface is in a hemisphere shape formed on a top surface of said base.

14. The resistance welding method according to claim 12, wherein said determination of said joining quality is made based on a comparison between said difference in distance between the flat portions of said two metal plates before and after said joining and a height of said projecting surface provided on said top part of said base.

15. The resistance welding method according to claim 12, wherein said determination of said joining quality is made based on a comparison between an area of said joining portion after said joining and a size of a sectional area of said two metal plates before said joining.

16. A method for manufacturing an electric power steering apparatus having a joining part of conductors formed by the resistance welding method of claim 8.

* * * * *